May 11, 1965 T. H. SCHULTZ ETAL 3,183,099
PREPARATION OF FLAVOR COMPOSITIONS
Filed Nov. 9, 1962 2 Sheets-Sheet 1

T. H. SCHULTZ & W.C. ROCKWELL
INVENTORS

BY R. Hoffman
W. Bier
ATTORNEYS

May 11, 1965 T. H. SCHULTZ ETAL 3,183,099
PREPARATION OF FLAVOR COMPOSITIONS
Filed Nov. 9, 1962 2 Sheets-Sheet 2

T.H. SCHULTZ & W.C. ROCKWELL
INVENTORS
BY R. Hoffman
W. Bier
ATTORNEYS

United States Patent Office 3,183,099
Patented May 11, 1965

3,183,099
PREPARATION OF FLAVOR COMPOSITIONS
Thomas H. Schultz, Lafayette, and William C. Rockwell, El Cerrito, Calif., assignors to the United States of America as represented by the Secretary of Agriculture
Filed Nov. 9, 1962, Ser. No. 236,747
1 Claim. (Cl. 99—140)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for preparing flavor compositions. Further objects of the invention will be evident from the following description wherein parts and percentages are by weight unless otherwise specified.

Figure 1:
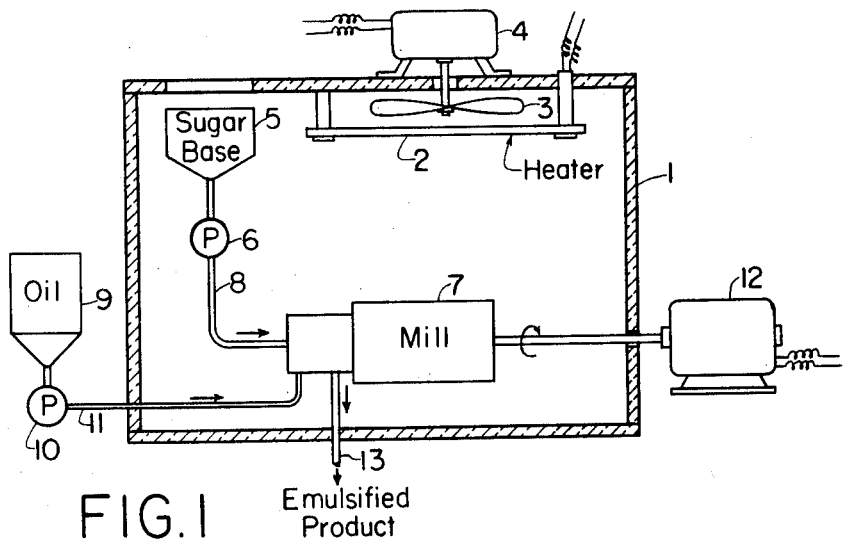
Figure 2:
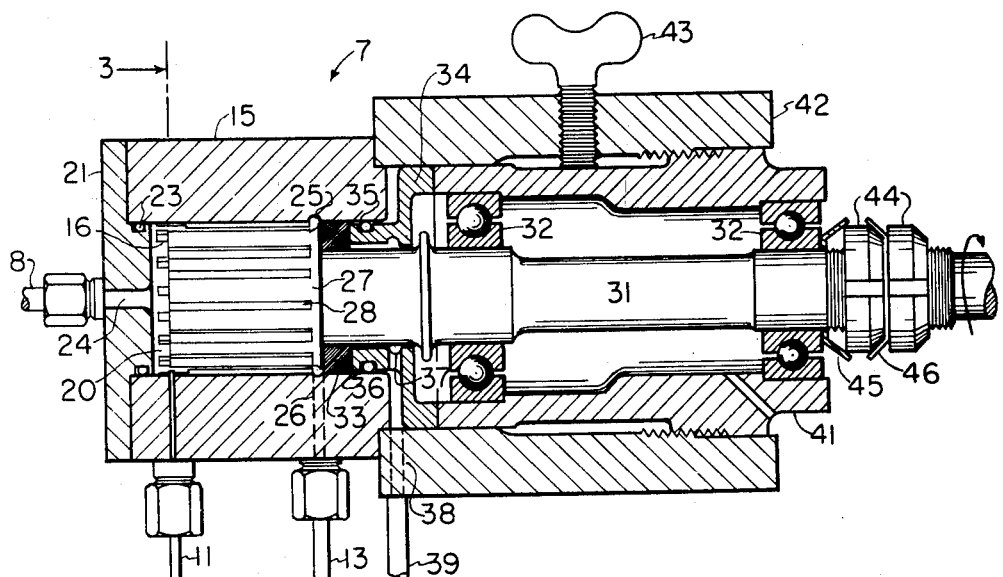
Figure 3:
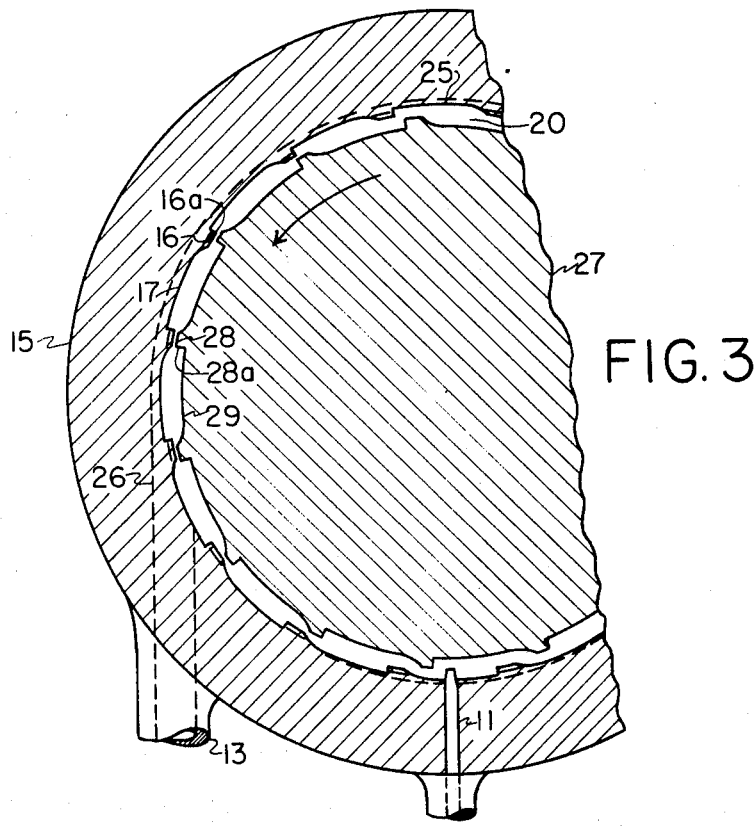
Figure 4:
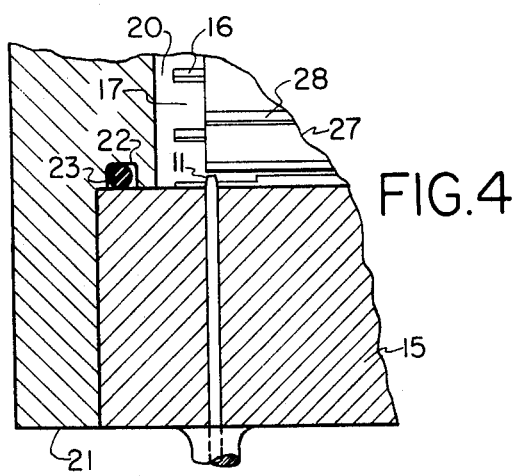

In the annexed drawing, FIG. 1 is a schematic diagram of a system for producing flavoring compositions in accordance with the invention. FIGS. 2, 3, and 4 depict in detail the mixer or mill of the invention which is used to obtain a uniform emulsion of an essential oil in a molten sugar base. FIG. 2 is a side elevation, partly in cross-section. FIG. 3 is a cross-section, on an enlarged scale, taken on plane 3—3 of FIG. 2. FIG. 4 is an enlarged view of the lower left-hand portion of FIG. 2.

It has been previously described in a series of patents (Schultz 2,856,291, Schultz et al. 2,857,281, Makower et al. 2,899,313, Schultz 2,919,989, Schultz et al. 2,929,-722, and Schultz et al. 2,929,723) that flavoring compositions can be prepared by emulsifying a flavoring agent, such as orange oil, with a molten sugar base, cooling the resulting composition to solidify it, and reducing the material into small particles. Such compositions are advantageously used in flavoring food products of all kinds, typically dehydrated fruit juices. A particular advantage of this procedure is that minute particles of the flavoring agent are emmeshed in a solid matrix of amorphous sugar whereby the flavoring agent is securely locked in the composition; that is, it is protected from decomposition and vaporization. As a result, the products can be stored for extended periods of time without losing their flavoring power and without developing off-flavors.

In preparing these flavoring compositions, one problem which has proved difficult in practice is the step of emulsifying the flavoring agent in the molten sugar base. This step is intrinsically difficult because the molten sugar base is very viscous and hence difficult to mix with the flavoring agent. A second point is that the flavoring agent tends to film out on metal surfaces rather than mix with the sugar base. Because of these factors, treating the materials in available devices, such as conventional colloid mills, leads to ineffective mixing. As a net result, the flavoring agent is not properly locked in the composition. Instead, it occurs therein in the form of relatively large pools which are not securely emmeshed in the sugar matrix, hence not adequately protected from decomposition and vaporization.

By proceeding in accordance with the invention, superior results are achieved in that the flavoring agent is rapidly and effectively emulsified into the molten sugar base so that the final products contain a matrix of amorphous sugar with the flavoring agent in the form of very minute particle dispersed uniformly throughout the sugar matrix, hence adequately locked-in or protected from decomposition and vaporization.

A key step in the process of the invention is that the flavoring agent and molten sugar base are mixed while exerting a repeated shearing action on the materials. Another key step is that the flavoring agent entering the mixing zone is not introduced as a solid stream but is chopped or sheared into tiny droplets immediately on entry. This prevents the oily material from filming out onto the surface of the mixer and ensures its uniform emulsification with the sugar base.

In FIG. 1 of the annexed drawing is illustrated the system for preparing flavor compositions in accordance with the invention. The system includes an insulated container 1 made of asbestos, glass fibers, or other insulating material. For maintaining the interior of container 1 at the desired temperature to preserve the emulsion in the liquid state, there is provided a series of electrical strip heaters 2 and fan 3 driven by electrical motor 4. The fan circulates air past heaters 2 (which are spaced from one another) and about the space in container 1.

The hot molten sugar base is introduced into reservoir 5, from which it is forced by pump 6 into mill 7 via tube 8. Pump 6 is peferably equipped with a variable speed drive (not illustrated) so that the rate of flow can be controlled. The flavoring agent is kept in reservoir 9 and is forced by pump 10 into mill 7 via tube 11. Pump 10 is preferably equipped with a variable speed drive (not illustrated) so that the rate of flow of flavoring agent can be regulated.

Within mill 7, actuated by variable speed electric motor 12, the flavoring agent and hot sugar base are intimately commingled (as described in detail hereinafter) to form a hot liquid emulsion, the sugar base forming the continuous phase and the flavoring agent the dispersed phase.

The hot emulsion of flavoring agent in molten sugar base flows out of mill 7 via tube 13. This material may be further treated to various ways. For example, the material may be caught in a pan as a thin layer which is allowed to cool and solidify. The cooled material is then broken up or ground into suitable particles. Another alternative, as described in Patent No. 2,856,291, involves allowing the stream to fall through the air until it is cooled to a plastic state. The material is then subdivided into rod-like pieces by action of a pair of rotating toothed cutter-wheels. The rod-like pieces are then further cooled to a solid state.

Referring now to FIGS. 2, 3, and 4, the mill generally designated as 7 includes a cylindrical stator 15 provided with narrow longitudinal ridges 16, separated by relatively wide valleys 17. Each ridge 16 is provided with a sharp leading edge 16a. The ridges 16 are cut down to half-height at the left hand end of the stator as shown, particularly in FIG. 4.

The working chamber 20 of mill 7 is sealed at the left-hand end by a cover plate 21 secured to stator 15. The cover plate 21 is provided with a circular groove 22 and an O-ring 23 therein to provide an effective seal. A bore 24 in plate 21 provides for flow of molten sugar base from pipe 8 into the working chamber 20.

For introduction of the flavoring agent, pipe 11 is extended through stator 15 and ends just short of the rotor ridges, as will be explained hereinbelow.

The product—the hot emulsion of flavoring agent in molten sugar base—is removed from chamber 20 by a spiral groove 25 cut into the periphery of stator 15 (note FIG. 3) which connects with bore 26 and pipe 13. As shown in FIG. 3, groove 25 starts out as a shallow cut near the bottom of stator 15, then proceeding in the direction of rotation (of rotor 27) the groove becomes deeper and finally merges with bore 26 which is aligned in a tangential direction.

Positioned within stator 15 is a rotor 27 provided with narrow longitudinal ridges 28, separated by relatively wide valleys 29. Each ridge 28 is equipped with a sharp leading edge 28a. Referring to FIG. 3 where the relationship of the parts is evident, the rotor ridges 28 clear the tip of tube 11 by a minute distance—0.003 inch. This has the important effect that the flavoring agent emerging from tube 11 cannot maintain itself as a continuous thread of liquid but is chopped into minute droplets thereby facilitating its emulsification with the sugar base.

Rotor 27 is mounted on a shaft 31 which is rotated in bearings 32 in the indicated direction by motor 12. To maintain rotor 27 in the proper position and to seal the right-hand end of chamber 20, there is provided a carbon seal ring 33. The right-hand end of rotor 27 is firmly held against ring 33 by an arrangement described below.

Seal ring 33 is backed up by a circular member 34 equipped with a circular groove 35 containing O-ring 36. A circular groove 37 is also provided in the inner periphery of member 34 for receiving any liquid which manages to ooze past carbon seal ring 33. Groove 37 leads to bore 38 and pipe 39 so that this leakage may be removed from the system. Seal ring 33 and member 34 are held in place by a threaded bearing housing 41 which is screwed into the mating threads of housing 42, the latter being securely fastened to stator 15. A locking screw 43 is provided for preventing rotation of bearing housing 41 after proper adjustment.

Shaft 31 is threaded at its right-hand end and provided with nuts 44 and spring washer 45. By tightening these nuts 44, the right-hand end of rotor 27 is drawn against the face of seal ring 33 (usually with a load of about 5 lbs.). Nuts 44 are preferably provided with a conventional locking arrangement or keeper 46 to prevent them from loosening as shaft 31 rotates.

In operation of mill 7, the hot molten sugar base is pumped through tube 8 into mill 7. The sugar base enters chamber 20 in an axial direction and spreads out radially. Then it moves longitudinally along the periphery of chamber 20 toward spiral groove 25. The flavoring agent is pumped into the system via tube 11. As this liquid emerges from the tip of tube 11 it meets the rapidly revolving rotor ridges 28 and is chopped or sheared into minute droplets which are mixed with the sugar base in the vicinity. As the mixture flows toward spiral groove 25, it is repeatedly subjected to mixing and shearing action by the cooperative effect of stationary ridges 16 and moving ridges 28. Since these respective ridges have a small clearance—0.004 inch—the material is subjected to intensive shearing action, thus forming a uniform emulsion of the essential oil in the sugar base, this product moving into spiral groove 25 and discharging through tube 13 as explained above. Contributing to the intimate mixing and shearing action attained is the structure of the ridges 16 and 28 in that their leading edges are sharp. As these sharp edges merge, any material therebetween is subjected to intensive cutting and mixing action. The turbulent effect so attained also causes a scouring effect so that material which might lodge ahead of the leading edges is swept away. The trailing edges of ridges 16 and 28 are not sharp but exhibit a gradually tapered profile. This is advantageous to avoid any pockets of unmixed material. These tapered surfaces are constantly scoured by the flow of material, which prevents any lodging. Also significant is the fact that the ridges 16 and 28 are narrow and the valleys 17 and 29 between individual ridges are wide. This construction has the advantage of allowing flow of the viscous material through the mill without an excessive pressure differential. This arrangement also contributes to a good scouring effect and avoids formation of pockets of unmixed material.

The invention may be utilized for the production of flavoring compositions from all types of volatile flavoring agents. Typical agents are, for example, orange oil, lemon oil, grapefruit oil, lime oil, clove oil, peppermint oil, bay oil, cedarwood oil, apple essence, pear essence, pineapple essence, grape essence, peach essence, apricot essence, strawberry essence, raspberry essence, cherry essence, plum essence, cinnamon oil, oil of nutmeg, oil of sage, oil of bitter almonds, cassia oil, teaseed oil, coffee essence, and so forth. Mixtures of different flavoring agents may, of course, be employed. In the case of fruit essences, such as those enumerated above, it is preferable to first purify them to remove water and low-molecular weight alcohols. This can be done, for example, by the process disclosed in the Dimick and Makower Patent No. 2,949,368. Materials such as edible oils and/or edible emulsifying agents may be added to assist in emulsifying the flavoring agent with the sugar base. Instead of or together with natural flavoring principals, synthetic flavoring agents may be used. Examples are the edible flavor and aroma-bearing aldehydes, alcohols, esters, ketones, phenols, and lactones, for example, methyl anthanilate, decanal, nonanal, undecanal, cinnamic, aldehyde, geraniol, menthol, methyl salicylate, phenylethyl alcohol, diacetyl, citronellol, citral, and so forth.

The proportion of the flavoring agent to be incorporated in the sugar base may be varied depending on the flavor strength desired in the final product. Usually, enough of the flavoring agent is added to furnish about from 5 to 15% thereof in the emulsion.

Regarding the sugar base, it is preferred to use a mixture of sugars to ensure formation of an amorphous material when the hot emulsion is cooled. Amorphous sugar bases are outstanding in the ability to lock in the flavoring agent. Various mixtures of sugar such as those containing two or more of the following are typical: sucrose, dextrose, maltose, lactose, levulose, mannose, galactose, etc. Products such as corn syrup or corn syrup solids with or without other sugar, such as sucrose, are useful. Especially preferred for use in accordance with the invention are mixtures of sugars having the following composition.

| Ingredient: | Percentage of total weight |
| --- | --- |
| Sucrose | 15 to 40 |
| Lactose | 10 to 15 |
| Maltose | 15 to 40 |
| Dextrose | 10 to 50 |
| Dextrin | 0 to 15 |

In preparing the sugar base, the sugars are dissolved or dispersed in water and the solution boiled until it reaches a solids content high enough that on cooling to room temperature it will form a hard glassy mass. In many cases when a boiling point of about 150° C. is attained, the solids content is at the proper level. At this stage the base contains at most about 2 to 4% water. After having attained the proper solids content the hot sugar base is cooled somewhat so that when the flavoring agent is incorporated therein the amount of evaporation of flavoring material will not be excessive and chemical deterioration of the flavoring material will not be appreciable. In any event, the molten material may be cooled as much as desired with the proviso that it remain fluid enough to mix with the flavoring material. In many cases the sugar base is cooled to about 100–120° C. prior to mixing with the flavoring agent.

To enhance emulsification of the flavoring agent and the sugar base, one may incorporate a minor amount of an emulsifying agent in the sugar base prior to adding the flavoring agent. Typical of the emulsifiers which may be used are partial esters of sucrose and higher fatty acids such as sucrose dipalmitate, sucrose monopalmitate; lecithin; monoglycerides such as glycerol monostearate, etc.

The invention is further demonstrated by the following illustrative example:

Example

A sugar base was prepared by combining the following ingredients.

| Ingredient: | Grams |
|---|---|
| Sucrose | 90 |
| Lactose | 36 |
| Dextrose | 40 |
| Corn syrup [1] | 108 |
| Water | 42 |

[1] Analysis: 20% dextrose, 31% maltose, and 18% trisaccharides, on moisture-free basis.

The mixture was heated with rapid stirring and boiled until its temperature rose to 150° C. Sucrose monopalmitate (1.25 g.) was then added and the sugar base allowed to cool to 106° C.

The sugar base as prepared above was emulsified with orange oil in a mill as shown in FIGS. 2, 3 and 4. The rotor of the mill was 1.08 inches in diameter and 1.25 inches long. The volume of the annular space between the rotor and stator was about 2.55 milliliters. Rotor 27 was provided with fifteen ridges, each 0.017 inch in height; stator 15 had sixteen ridges, each 0.019 inch in height. The air in container 1 was held at 105° C.

With rotor 27 revolving at 865 r.p.m., the sugar base at 106° C. was pumped into mill 7 at the rate of 5.0 milliliters per minute. At the same time, the orange oil, at room temperature, was pumped into the mill at the rate of 0.65 milliliter per minute. The product emerging from tube 13 was collected as a ribbon on an aluminum pan, and cooled to solidify it. The product was found to have an orange oil content of 7.9% (volume/weight basis) and on optical examination it was found that the oil was uniformly emulsified in the sugar base in the form of very minute globules, most of which had diameters from less than 0.005 mm. up to 0.05 mm.

Having thus described the invention, what is claimed is:

A process for preparing a solid flavoring composition which comprises feeding a hot molten sugar base axially into a treatment zone, subjecting the sugar base therein to centrifugal action to cause it to flow outwardly and radially, concomitantly introducing a stream of liquid flavoring agent into said zone in a radial path directed toward the center of the zone, chopping said stream immediately upon its entry into said zone into minute droplets, subjecting the flavoring agent and sugar base to intimate mixing and repeated application of shearing to form a uniform emulsion of flavoring agent in the sugar base, removing said emulsion from the treatment zone and cooling and solidifying it.

References Cited by the Examiner

UNITED STATES PATENTS

| 1,807,773 | 6/31 | Dawson. | |
| 2,389,486 | 11/45 | Colony | 259—10 |
| 2,856,291 | 10/58 | Schultz | 99—140 |
| 2,857,281 | 10/58 | Schultz et al. | 99—140 |
| 2,898,092 | 8/59 | Miller et al. | 259—10 |

FOREIGN PATENTS

| 865,127 | 4/61 | Great Britain. |

A. LOUIS MONACELL, *Primary Examiner.*

BEATRICE H. STRIZAK, *Examiner.*